3,406,140
POLYURETHANE COMPOSITION CONTAINING AN EPOXY COMPOUND AS A STABILIZER
Walter John Polestak, Summit, and James Francis Tracy, Millington, N.J., assignors to Celanese Corporation, a corporation of Delaware
No Drawing. Filed Jan. 9, 1964, Ser. No. 336,618
18 Claims. (Cl. 260—33.4)

ABSTRACT OF THE DISCLOSURE

An improved fiber spinning composition for spandex type fibers wherein improved stability is obtained by the addition of an organic epoxy compound as a stabilizer.

---

Our invention relates to improved solutions of polymer forming materials and more particularly relates to spinning solutions having improved stability for use in forming fibers of segmented, elastomeric copolymers.

In one method for spinning segmented, elastomeric copolymers, the copolymer is dissolved, usually at an elevated temperature, in a solvent which can be broadly defined as halogenated hydrocarbons or mixtures of halogenated hydrocarbons and alkanols. These solutions are subsequently employed to spin the elastomeric fibers. It has been found, however, that under the influence of heat, shear and time the dissolved copolymer shows a loss in its intrinsic viscosity and an increase in color. As a consequence, the stability of the spinning solution is affected and the resulting fibers reveal poor and undesirable physical properties and color development.

We have found that the presence of a small amount of an epoxy compound is effective to prevent degradation of the copolymer in solution from the standpoint of intrinsic or inherent viscosity and color retention. Usually the presence of from 0.05 to 10% by weight of the solution of the epoxy compound is sufficient to effect the improved stability of the solution.

The term "segmented elastomeric copolymers" as used throughout this specification and in the claims is meant to describe elastomeric copolymers comprised of two principal types of segments which are chemically connected and alternate in the copolymer chain. One segment, which is essentially amorphous, is derived from low melting amorphous polymers such as, for example, an ester polymer, an ether polymer, a hydrocarbon polymer, polyamide and polyurea. The other segment is derived from a crystalline high melting polymer such as, for example, a urea polymer, a urethane polymer, amid epolymer or bisurylene.

In particular, the amorphous segments of these elastomers are derived from low melting polymers having a melting point below about 50° C., having a molecular weight above about 600 and containing terminal radicals possessing active hydrogen atoms. The crystalline or hard segments are derived from linear crystalline polymers having a melting point above about 200° C. in their fiber forming molecular weight range, i.e., above about 5,000. The amorphous segments, as present in the elastomer appear as radicals of the initial polymer from which the terminal active hydrogens have been removed. Generally, the crystalline segments comprise from about 10% to about 40% by weight of the segmented copolymer and may be defined as comprising at least one repeating unit of the linear crystalline polymer from which they are derived.

The preparation of these segmented elastomeric copolymers is well known in the art and is described, for example, in U.S. Patent Nos. 2,625,535, 2,813,776, 2,871,218, 2,953,839, 2,957,852, 2,962,470, and Reissue 24,691.

The polymeric structure of some of these elastomers can be represented by the formula for the respective segments which repeat in the polymer chain in which the amorphous segment has the formula

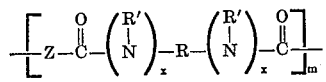

and the crystalline segment has the formula

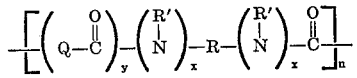

wherein Z is a bivalent organic radical which is inert to isocyanate groups at room temperature; R is a bivalent organic radical; Q is a bivalent chain-extending radical, preferably a member of the class consisting of hydrazo and organic diamino; $m$ and $n$ are integers greater than 0; $x$ and $y$ are integers from 0 to 1 with the provision that when one is 0 the other is 1; and R' is a member of the class consisting of hydrogen and a monovalent organic radical. More particularly, Z is the residue resulting from the removal of all or part of each of the terminal functional groups of a polymer melting below 50° C., having a molecular weight above about 600 and containing terminal functional groups possessing active hydrogen. For example, when the terminal functional group is —COOH, the entire group would be removed. When it is —OH, the terminal hydrogen atom would be removed. Terminal functional groups possessing active hydrogen can be for example —OH, —NH$_2$, —SH, —COOH, —CO—NH$_2$, =NH, —CS—NH$_2$, —SO$_2$NH$_2$ and —SO$_2$OH. The bivalent radicals Q, R and Z should be free of active hydrogen. Chain-extending radical Q may be derived from chain extenders such as, for example, hydrazine and substituted hydrazines, organic diamines, glycols, amino alcohols, etc. Chain extension may also be effected by using water.

Generally, these synthetic elastomers are copolymer formulations based on low molecular weight aliphatic polyesters or polyethers having terminal hydroxyl and/or carboxyl groups which are capable of further reaction with diisocyanates. This latter reaction can be used to couple the lower molecular weight polyester or polyether via ureathane links or the diisocyanate can be used in excess so that it becomes a terminal group. In this latter case, the macrodiisocyanates formed can be coupled by means of other reagents such as water, diols, amino alcohols and diamines with the subsequent formation of the high polymer. These elastomeric products are also known as block copolymers.

Illustrative of the types of elastomeric copolymers suitable for employment in formulating the improved spinning solution of our invention are isocyanate modified polyesters such as those described in U.S. Patent 2,755,266 wherein linear polyesters prepared from polycarboxylic acids and polyhydric alcohols are reacted with an excess of a diisocyanate over the terminal hydroxyl groups of the polyester to form diisocyanate modified polyesters containing terminal isocyanate groups and then further reacting the polymer with a bifunctional cross-linking agent. Polyesterurethane copolymers which are substantially free of cross-links, such as those described in U.S. Patent 2,871,218 wherein a critical ratio of an essentially linear hydroxyl terminated polyester prepared from a saturated aliphatic glycol having terminal hydroxyl groups and a dicarboxylic acid or its anhydride, and a diphenyl diisocyanate are reacted in the presence of a saturated aliphatic free glycol having terminal hydroxyl groups so that no unreacted isocyanate and hydroxyl groups remain, can also be employed. Broadly such a copolymer is obtained by reacting one mole of polyester with from 1.1 to 3.1 moles of a diphenyl diisocyanate in the presence of from about 0.1 to 2.1 moles of free glycol. Another type of elastomeric copolymer which can be used in our invention is the type described in U.S. Patent 2,957,852. An elastomer of this type can be prepared by providing polyether glycol with isocyanate ends by reaction with a diisocyanate. This "capped" prepolymer can then be reacted with a chain-extension agent such as a hydrazine which provides a final polymer having repeating units containing hydrazine resins linked through carbonyl groups.

The spinning solutions of our invention usually have a solids content ranging from about 5 up to about 30% by weight or more based on the total solution of the fiber forming elastomers described above. The spinning solution can also contain up to about 5% by weight based on the elastomer present of pigments, such as, for example, titanium dioxide. Minor amounts of additives such as antioxidants, can also be included in the spinning solutions, however, care must be exercised in the selection of the additives since some compositions tend to degrade the polymer.

The solvents employed in the improved spinning solution to which our invention relates include halogenated hydrocarbons or mixtures of a halogenated hydrocarbon and an alcohol, such as, for example, the lower halo-alkanes or mixtures of a lower halo-alkane and a lower aliphatic alcohol. The contemplated lower halo-alkanes suitably contain at least one halogen, preferably chlorine, atom and one hydrogen atom attached to each carbon atom in the molecule, e.g., methylene chloride and ethylene chloride.

The preferred lower aliphatic alcohols are lower alkanols, e.g., methanol, ethanol and isopropanol.

Improved stability of the spinning solutions is particularly noticeable when employing a solvent such as methylene chloride or a mixture of methylene chloride and methanol. When employing a halo-alkane-aliphatic alcohol solvent mixture in the improved spinning solutions of our invention, the halo-alkane should constitute at least 50% by volume of the entire solvent and preferably comprises from about 60 to 95% by volume of the solvent while the aliphatic alcohol comprises from about 40 to 5% by volume.

In the preferred dry spinning operation from about 5 to about 25% by weight, based upon the total solution, of a copolymer comprising first and second segments alternating in the copolymer chain, the first segment having the formula

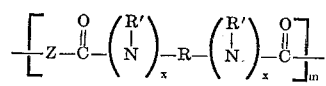

and the second segment having the formula

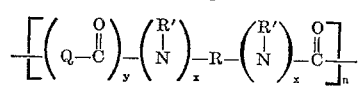

wherein Z is a bivalent organic radical which is inert to isocyanate groups at room temperature resulting from the removal of at least part of each of the terminal functional groups of a linear polymer melting below 50° C., having a molecular weight above about 600 and containing terminal functional groups possessing active hydrogen, R is a bivalent organic radical free of active hydrogen, Q is a bivalent chain-extending radical, m and n are integers greater than 0, x and y are integers from 0 to 1 with the provision that when one is 0 the other is 1, R' is a member of the class consisting of hydrogen and monovalent organic radicals, and the structure of the second segment represents a repeating unit of a linear crystalline polymer having a melting point above about 200° C. in its fiber-forming molecular weight range, is dissolved in a solvent consisting essentially of a major portion of an alkylene halide and a minor portion of a lower aliphatic alcohol at an elevated temperature from about 50° to about 100° C. and at a pressure sufficient to maintain the solution in the liquid phase at the elevated temperature, and is thereafter extruded (while the elevated temperature and pressure is maintained), through a spinnerette into a heated downdraft cabinet at substantially atmospheric pressure thereby substantially removing the solvent from the copolymer, the solution comprising as a stabilizer from about 0.05 to 10% by weight based on the solution of an organic epoxy compound having from 2 to 20 carbon atoms and from 1 to 3 functional epoxy groups selected from the group consisting of aliphatic epoxides, aliphatic substituted cyclo-aliphatic epoxides and aromatic substituted aliphatic epoxides.

The epoxy compounds suitable for employment in our invention can generally be described as organic epoxy compounds, preferably containing from 2 to 20 carbon atoms and from 1 to 3 functional epoxy groups, although polymeric epoxides containing upwards of 20 carbon atoms can also be employed, such as, for example, the polymeric epoxides commercially available under the trademarks "Epon" and "Epoxol." Advantageously, the epoxy compounds employed are aliphatic epoxides, aliphatic substituted cyclo-aliphatic, or alicyclic, epoxides and aromatic substituted aliphatic epoxides. The aliphatic epoxy compounds include, for example, epoxyethylene, 1,2-epoxybutylene, dodecene oxide (1,2-epoxy dodecane), 1,2-epoxyoctadecane, n-butyl glycidyl ether and 2,3-propanediol glycidyl ether. The aliphatic substituted cyclo-aliphatic epoxy compounds include, for example, dipentene dioxide (limonene dioxide), vinylcyclohexene dioxide (1-epoxyethyl-3,4-epoxycyclohexane), α-pinene oxide (d-2,6,6-trimethyl-2,3-epoxybicyclo[3,1,1]heptane), dipentene monoxide (limonene monoxide) and vinylcyclohexene monoxide (1-ethenyl-3,4-epoxycyclohexane). The aromatic substituted aliphatic epoxy compounds include, for example, styrene oxide (epoxyethylbenzene), phenyl glycidyl ether (1-phenoxy-2,3-epoxypropane), γ-phenylpropylene oxide (1-phenyl-2,3-epoxypropane) and α-phenyl-α-[2-hydroxyphenyl]-ethylene oxide.

It is believed that the polymer degradation processes are initiated by the combined actions of heat, shear and the solvent. Acidic species formed in solution attack and open such susceptible bonds as, for example, the allophanate, ester and urethane linkages, causing chain rupture or scission at random points along the chain. This breakdown of the copolymers leads to a reduction in the intrinsic viscosity of the copolymers as well as to the introduction of undesirable color effects. It is believed that the epoxy stabilizers function as acid acceptors, i.e., the highly reactive epoxy groups combine with the acids formed during the copolymer dissolution and mixing. In addition to providing inherent viscosity stability, the epoxy compounds also reduce the formation of polymer color due to the action of heat and subsequent polymer breakdown.

We have also found that our invention is effective when employed with spinning solutions comprising blends of comparatively flexible and comparatively stiff segmented, elastomeric copolymers.

In this aspect of our invention, both the stiff and the flexible copolymer are of the type described above. For example, both the stiff and the flexible copolymers can be synthesized from substantially the same starting material or at least starting materials of the same type. Thus, a soft or flexible copolymer of the type described in U.S. Patent 2,871,218 can be produced by employing as starting materials larger proportions of the linear polyester and the aliphatic glycol thereby producing a segmented copolymer having a greater number of amorphous or soft blocks. Similarly, a higher molecular weight amorphous polymer employed as a starting material will provide a copolymer having longer soft blocks. To obtain a comparatively stiff copolymer a larger proportion of the diisocyanate, the linear crystalline component, can be employed thereby producing a segmented copolymer having a larger number of rigid blocks or a copolymer having longer rigid blocks depending upon the relative proportions of the other ingredients or upon the molecular weight of the polyester. Thus, it will be seen that the stiffness or flexibility of the resulting copolymer can be affected by only very small variations in the molar ratios of the ingredients and/or employing a polyester of a higher or lower molecular weight.

All values of inherent viscosity in the specification are calculated from the equation:

$$\text{Inherent viscosity} = \frac{\ln R}{C}$$

wherein R is the viscosity of a solution of 0.5 gram of the polymer in 100 milliliters of meta-cresol at 30° C. divided by the viscosity of meta-cresol in the same units and at the same temperature, and C is the concentration of the polymer solution in grams of polymer per 100 milliliters of solution.

In order to describe our invention more completely reference is made to the following examples:

Example I

In this example a group of epoxy compounds were screened to determine their effectiveness as a stabilizer. A polyester urethane copolymer of the type described in U.S. Patent 2,871,218 and obtained by reacting hydroxyl poly(tetramethylene adipate) [mol. wt. about 1000], butanediol-1,4 and diphenyl methane-p,p'-diisocyanate in a molar ratio of 1.0:1.0:2.0, respectively, was dissolved in a methylene chloride/methanol (91/9) solvent mixture at a temperature of about 65° C. The quantity of copolymer employed was sufficient to provide a solution of 20% by weight solids based on the weight of the total solution. Samples of this solution were separated and combined with varying proportions of several different epoxy compounds. Another sample of the copolymer solution to which no epoxy compound was added was also separated. This epoxy-free sample was maintained as a control.

Each of the samples was placed within a glass pressure bomb and tumbled in an oil bath which was controlled to maintain a constant temperature of 65° C.±0.5° C. for the periods of time indicated below. The residue was recovered from each of the glass bombs and subsequently dried under vacuo at room temperature. Each of the samples was then submitted for inherent viscosity (I.V.) determination. The color of each of the residues was also noted. The results obtained for each of these samples, including the control sample, are shown below in Table I.

TABLE I

[Copolymer I.V.=1.00; 20% solution tumbled in bath at 65° C., glass system]

| Additives (percent by wt. based on solution) | Time, hrs. | I.V. | Color of residue |
|---|---|---|---|
| None | 120 | 0.72 | Amber. |
| Propylene oxide (epoxypropane) (0.4) | 118 | 0.82 | Medium yellow. |
| 1,2-butylene oxide (1.0) | 120 | 0.84 | Dark yellow. |
| Dodecene oxide (1,2-epoxydodecane) (0.1) | 140 | 0.78 | Light amber. |
| Mixed 1,2-epoxyhexadecane and 1,2-epoxyoctadecane.* (0.8) | 115 | 0.78 | Dark yellow. |

*Approximately 60% by wt. $C_{16}$ and 40% by wt. $C_{18}$.

From the above table it can be seen that the presence of the epoxy compounds in each of the samples improves the stability of the copolymer solution regarding inherent viscosity as compared to a similar sample not containing an epoxy compound. It can also be seen that the epoxy compounds substantially lessen the color development of the solutions. Good results have also been obtained with mixtures of these epoxy compounds and commercially available antioxidants which of themselves show no stabilizing tendencies. Such antioxidants include, for example, Geigy RA-565 and Catalin CAO-1. While both the Geigy RA-565 and Catalin CAO-1 in the absence of our epoxy stabilizers cause a degradation of elastomer I.V. and the RA-565 alone imparts a dark brown color to the residue, such effects are more than offset by the stabilizing effect of the epoxy compounds.

Example II

In this example the procedure of Example I was again followed employing solutions in which the copolymer constituted 20% by weight of the solution. In this example, however, each of the epoxy containing samples was provided with its own epoxide-free control sample in order to obtain a more accurate comparison. The results are indicated below in Table II.

TABLE II
[Copolymer I.V.=1.00; 20% solution tumbled in bath at 64° C., glass systems]

| Additive (percent by wt. based on solution) | Time, hrs. | I.V. | Color of residue |
|---|---|---|---|
| None | 120 | 0.72 | Amber. |
| 3,4-epoxy-6-methylcyclohexylmethyl-3,4-epoxy-6-methylcyclohexanecarboxylate.[2] | (0.6) 120 | 0.83 | Light yellow. |
| None | 117 | 0.72 | Amber. |
| 3,4-epoxy-6-methylcyclohexylmethyl-3,4-epoxy-6-methylcyclohexanecarboxylate. | (0.6) 117 | 0.88 | Light amber. |
| Same | (0.1) 117 | 0.84 | Do. |
| Vinylcyclohexene dioxide (1-epoxyethyl-3,4-epoxycyclohexane). | (0.6) 117 | 0.89 | Do. |
| Dicyclopentadiene dioxide [3] | (0.1) 117 | 0.87 | Do. |
| None | 140 | 0.75 | Amber. |
| Vinylcyclohexene dioxide | (0.8) 140 | 0.84 | Yellow. |
| None [1] | 68 | 0.78 | Amber. |
| Dipentene dioxide [1] (1-epoxyisopropyl-3,4-epoxy-4-methylcyclohexane). | (1.0) 68 | 0.91 | Yellow. |
| None [1] | 119 | 0.74 | Amber. |
| Styrene oxide [1] (epoxyethylbenzene) | (0.6) 119 | 0.88 | Yellow. |

[1] Glass pressure tube used in conjunction with a stainless steel cap.

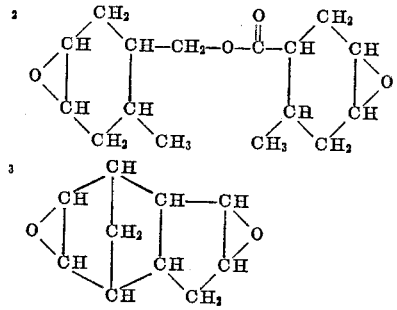

It must be noted when interpreting the data of Table II that a stainless steel cap was employed with the glass pressure bomb in two of the groups. As those skilled in the art will be aware, the contact of the spinning solution with stainless steel equipment has a tendency to increase copolymer degradation in the solution.

Example III

In this example stainless steel bombs were employed in order to provide data obtained from conditions more closely approximating those encountered in commercial production, since stainless steel equipment is commonly employed in the spinning apparatus. Again, following the same procedure and using the same solvent and copolymer as employed in Example I, the copolymer solutions were tumbled in an oil bath at a temperature of 65° C. and the residue recovered was dried under vacuo at room temperature. In this example a separate control sample was provided for each set of conditions and for each epoxide employed. The results obtained are seen below in Table III.

TABLE III
[Copolymer I.V.=1.00; 20 solutions tumbled in bath at 65° C., stainless steel systems]

| Additive (percent by wt. based on solution) | Time, hrs. | I.V. | Color of residue |
|---|---|---|---|
| None | 68 | 0.51 | Amber. |
| Dipentene dioxide | (0.8) 68 | 0.90 | Light Amber. |
| Do | (3.6) 68 | 0.87 | Do. |
| None | 141 | 0.48 | Amber. |
| Vinylcyclohexene dioxide | (0.8) 141 | 0.81 | Light yellow. |
| None | 140 | 0.75 | Amber. |
| Vinylcyclohexene dioxide | (0.8) 140 | 0.84 | Yellow. |
| None | 119 | 0.77 | Amber. |
| Vinylcyclohexene dioxide | (0.8) 119 | 0.86 | Light yellow. |

Generally comparing the data of Examples I and II to the corresponding data in Example III it can be seen that the glass systems of I and II tend to provide more stability to the copolymers due to the general inertness of the glass. Furthermore, examination of the copolymer films adhering to the stainless steel surfaces revealed the presence of iron, which contaminant is also suspected of contributing, to some degree, to the degradation losses experienced.

It can be seen from the data in Table III that the presence of even extremely small amounts of the reagents listed provides a definite improvement from a standpoint of reducing I.V. losses while retaining good polymer color. Furthermore, the improvement to be gained with the use of the epoxides in a stainless steel system is more significant than the improvement obtained in a glass system.

Example IV

In this example a solution containing 25% by weight of the copolymer employed in the preceding examples was tumbled in a stainless steel bomb at a temperature of 65° C. for a period of 121 hours. The solvent system employed was a mixture of methylene chloride and methanol (91/9) as in the previous examples. The copolymer initially had an I.V. of 1.00. After tumbling for 121 hours, the I.V. had decreased to 0.71 and the residue was a dark amber color.

To demonstrate the efficacy of our invention in contrast to the above results a yarn was spun from a copolymer blend of the comparatively stiff polyesterurethane copolymer of the preceding examples, obtained by reacting hydroxyl poly (tetramethylene adipate) [molecular weight about 1000], butanediol-1,4 and diphenyl methane-p,p'-diisocyanate in a molar ratio of about 1.0:1.0:2.0, respectively, and a compartively soft or flexible polyesterurethane copolymer obtained by reacting hydroxyl poly (tetramethylene adipate) [molecular weight about 800], butanediol-1,4 and diphenyl methane-p,p'-diisocyanate in a molar ratio of about 1.0:0.3:1.3, respectively. The comparatively stiff copolymer and the comparatively flexible copolymer were present in the solution in a 70/30 weight ratio, respectively. The yarn was spun from a methylene chloride/methanol (91/9) system containing an epoxy additive, vinylcyclohexene dioxide. The length of time the elastomer remained in the spinning solution and the I.V. of the yarn obtained are set forth below in Table IV.

TABLE IV
[Copolymer blend (70/30), I.V.=1.21]

| Polymer in solution, time, in hrs.: | Yarn I.V. |
|---|---|
| 5 | 1.23 |
| 22 [1] | 1.28 |

[1] Solution held at temperature of 40° C.

Notwithstanding the extreme degradation of the copolymer in the methylene chloride/methanol system in the absence of an epoxy additive, as mentioned above, the yarn spun from such a solution containing the epoxy additive has an enhanced I.V. as indicated by the data in Table IV. Furthermore, the I.V. of the yarn obtained after a period of approximately one day (22 hours) revealed no I.V. degradation. This is particularly significant in that previous experiences with yarn spun from the methylene chloride/methanol system without stabilizers showed that spinning stability became marginal due to the extremely low copolymer I.V. resulting from degradation when maintained at an elevated temperature for periods far less than one day. Moreover, previous attampts to spin a yarn from such a solvent system demonstrated a 0.2 I.V. drop from the copolymer in solution to the yarn. In this example there was an increase in I.V. of 0.2 from polymer to yarn.

Example V

Another spinning solution of a copolymer similar to that employed in Examples I through III and containing the additive vinylcyclohexene dioxide was prepared. The spinning solution employed contained 24% by weight based on the solution of the copolymer, 5% by weight based on the copolymer of titanium dioxide and 0.6% by weight based on the solution of vinylcyclohexene dioxide. The solvent employed was the (91/9) methylene chloride/methanol solvent system employed in the previous examples. The temperature of the system was maintained at 60° C. The length of time the copolymer was in solution and the I.V. of the yarn obtained are shown below in Table V.

TABLE V
[Copolymer I.V.=1.17]

| Copolymer in solution, time in hrs.: | Yarn I.V. |
|---|---|
| 5 | 1.11 |
| 7½ | 1.07 |
| 66 (Candle) [2] | 1.13 |
| 66 | 0.93 |
| 68 | 0.98 |

[2] Filter candle contains a dressing of viscose fabric and a commercially available filtering agent made of industrial cotton which are substantialy inert to the copolymers.

The results shown in Table V become particularly significant since previous experience showed that it was not possible to maintain the spinning solution at an elevated temperature for a period of time of even less than one day and still obtain a successful spinning. A comparison of the two sets of data obtained at a period of 66 hours also substantiates the position that the spinning solution in contact with stainless steel degrades more rapidly.

Samples of the yarn obtained from the spinnings shown in Table V were subjected to physical testing and these physical properties are shown in Table VI. The yarn obtained from the solutions maintained for 5 and 7½ hours is designated as Spinning No. 1, while the yarn obtained from the solutions maintains for 66 and 68 hours is designated as Spinning No. 2. All values shown are average values obtained by testing several samples.

TABLE VI
Spinning No. 1
[Copolymer I.V.=1.17]

| Take-up speed | Percent elong. | Average values | | |
|---|---|---|---|---|
| | | Ten., g./d. | Stress at 300% strain, g./d. | Perm. set, percent |
| Grand average | 390 | 0.70 | 0.38 | 15.0 |
| 120 meters/min | 380 | 0.68 | 0.40 | 14.6 |
| 80 meters/min | 430 | 0.74 | 0.33 | 15.8 |

Spinning No. 2

| Take-up speed | Percent elong. | Average values | | |
|---|---|---|---|---|
| | | Ten., g./d. | Stress at 300% strain, g./d. | Perm. set, percent |
| Grand average | 440 | 0.68 | 0.30 | 17.7 |
| 120 meters/min | 435 | 0.67 | 0.32 | 17.7 |
| 80 meters/min | 450 | 0.72 | 0.26 | 17.7 |
| (Candle) | 400 | 0.74 | 0.39 | 14.5 |

The data shown in Table VI indicate that, notwithstanding the fact that an interval of some 60 hours elapsed between the two spinnings, the yarn obtained from the later spinning possessed properties which were substantially the same as those of the yarn obtained in the earlier spinning. The only change was a slightly poorer level of permanent set. The data does, however, demonstrate the fact that the employment of an epoxy additive of our invention is effective to stabilize the spinning solutions for extended periods of time.

The embodiments of the invention in which an exclusive property or privilege is claimed are defined as follows:

1. An improved spinning solution which comprises a substantially linear, segmented, elastomeric copolymer dissolved in a solvent and an epoxy compound as a stabilizer, the elastomeric copolymer being comprised essentially of first and second segments alternating in the polymer chain, the first segment having the formula

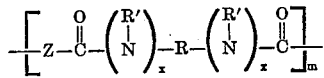

and the second segment having the formula

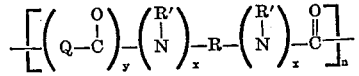

wherein Z is a bivalent radical which is insert to isocyanate groups at room temperature resulting from the removal of at least part of each of the terminal functional groups of a linear polymer melting below 50° C., having a molecular weight above about 600 and containing terminal functional groups possessing active hydrogen, R is a bivalent organic radical, Q is a bivalent chain-extending radical, $m$ and $n$ are integers greater than 0, and $x$ and $y$ are integers from 0 to 1 with the provision that when one is 0 the other is 1, R' is a member of the class consisting of hydrogen and monovalent organic radicals, and the structure of the second segment represents a repeating unit of a linear crystalline polymer having a melting point above about 200° C. in its fiber-forming molecular weight range.

2. The spinning solution of claim 1 wherein the epoxy compound contains from 2 to 20 carbon atoms and contains from 1 to 3 functional epoxy groups.

3. The spinning solution of claim 2 wherein the epoxy compound is selected from the group consisting of aliphatic epoxides, aliphatic substituted cyclo-aliphatic epoxides and aromatic substituted aliphatic epoxides.

4. An improved spinning solution which comprises a substantially linear, segmented, elastomeric copolymer dissolved in a solvent mixture and an epoxy compound as a stabilizer, the solvent being selected from the group consisting of lower alkylene halides and mixtures of lower alkylene halides and lower aliphatic alcohols, the elastomeric copolymer being comprised essentially of first and second segments alternating in the polymer chain, the first segment having the formula

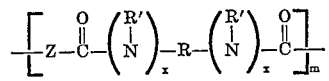

and the second segment having the formula

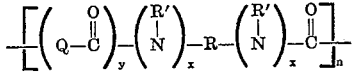

wherein Z is a bivalent radical which is inert to isocyanate groups at room temperature resulting from the removal of at least part of each of the terminal functional groups of a linear polymer melting below 50° C., having a molecular weight above about 600 and containing terminal functional groups possessing active hydrogen, R is a bivalent organic radical, Q is a bivalent chain-extending radical, $m$ and $n$ are integers greater than 0, and $x$ and $y$ are integers from 0 to 1 with the provision that when one is 0 the other is 1, R' is a member of the class consisting of hydrogen and monovalent organic radicals, and the structure of the second segment represents a repeating unit of a linear crystalline polymer having a melting point above about 200° C. in its fiber-forming molecular weight range, and the epoxy compound containing from 2 to 20 carbon atoms and containing from 1 to 3 functional epoxy groups.

5. The spinning solution of claim 4 wherein the first segment is derived from a material selected from the group consisting essentially of polyesters and polyethers, the second segment is derived from an organic diisocyanate reaction product, and the solvent is a mixture comprising a major portion of methylene chloride and a minor portion of methanol.

6. The spinning solution of claim 4 wherein the epoxy compound comprises from about 0.05 to 10% by weight of the total solution.

7. The spinning solution of claim 4 wherein the epoxy compound is selected from the group consisting of aliphatic epoxides, aliphatic substituted cyclo-aliphatic epoxides and aromatic substituted aliphatic epoxides in which the epoxy groups are attached to the aliphatic and cyclo-aliphatic constitutents.

8. An improved spinning solution for use in dry spinning elastomeric copolymers which comprises a solution of from about 5 to about 25% by weight based on the total solution of an essentially linear, segmented, elastomeric copolymer in a solvent consisting essentially of a major portion of an alkylene halide and a minor portion of a lower aliphatic alcohol, and from about 0.05 to 10% by weight based on the total solution of an organic epoxy compound as a stabilizer, the elastomeric copolymer being comprised essentially of first and second segments alternating in the copolymer chain, the first segment having the formula

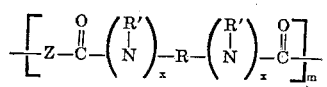

and the second segment having the formula

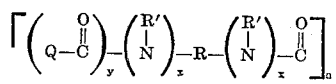

wherein Z is a bivalent radical which is inert to isocyanate groups at room temperature resulting from the removal of at least part of each of the terminal functional groups of a linear polymer melting below 50° C., having a molecular weight above about 600 and containing terminal functional groups possessing active hydrogen, R is a bivalent organic radical free of active hydrogen, Q is a bivalent chain-extending radical, $m$ and $n$ are integers greater than 0, $x$ and $y$ are integers from 0 to 1 with the provision that when one is 0 the other is 1, R' is a member of the class consisting of hydrogen and monovalent organic radicals, and the structure of the second segment represents a repeating unit of a linear crystalline polymer having a melting point above about 200° C. in its fiber-forming molecular weight range, and the epoxy compound containing from 2 to 20 carbon atoms and containing from 1 to 3 functional epoxy groups.

9. The spinning solution of claim 8 wherein the alkylene halide comprises from about 60 to about 95% by volume of the solvent and the aliphatic alcohol comprises from about 40 to about 5% by volume of the solvent.

10. The spinning solution of claim 8 wherein the spinning solution also contains up to 5% by weight based on the elastomeric copolymer present of a pigment.

11. The spinning solution of claim 9 wherein the alkylene halide is methylene chloride and the aliphatic alcohol is methanol and wherein the spinning solution also contains up to 5% by weight based on the elastomeric copolymer present of titanium dioxide.

12. The spinning solution of claim 8 wherein the epoxy compound is selected from the group consisting of dipentene dioxide, hexadecene oxide, octadecene oxide, butene oxide, dodecene oxide, 3,4-epoxy-6-methylcyclohexylmethyl-3,4-epoxy-6 - methylcyclohexanecarboxylate, vinylcyclohexene dioxide, dicyclopentadiene dioxide and styrene oxide.

13. In the process of forming an elastomeric fiber which comprises dissolving the copolymer of claim 1 in a solvent at an elevated temperature and at a sufficient pressure to maintain the solution in the liquid state, maintaining the solution at the elevated temperature and the pressure, and then extruding the solution through a spinnerette, the improvement which comprises incorporating into the solution an epoxy compound as a stabilizer.

14. The process of claim 13 wherein the epoxy compound is an organic compound containing from 2 to 20 carbon atoms and containing from 1 to 3 functional epoxy groups.

15. In the process of dry spinning an essentially linear, segmented, elastomeric copolymer which comprises dissolving from about 5 to about 25% by weight based on the total solution of a copolymer comprising first and second segments alternating in the copolymer chain, the first segment having the formula

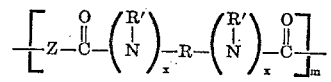

and the second segment having the formula

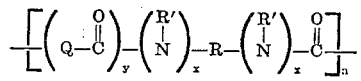

wherein Z is a bivalent organic radical which is inert to isocyanate groups at room temperature resulting from the removal of at least part of each of the terminal functional groups of a linear polymer melting below 50° C., having a molecular weight above about 600 and containing terminal functional groups possessing active hydrogen, R is a bivalent organic radical free of active hydrogen, Q is a bivalent chain-extending radical, $m$ and $n$ are integers greater than 0, $x$ and $y$ are integers from 0 to 1 with the provision that when one is 0 the other is 1, R' is a member of the class consisting of hydrogen and monovalent organic radicals, and the structure of the second segment represents a repeating unit of a linear crystalline polymer having a melting point above about 200° C. in its fiber-forming molecular weight range, in a solvent consisting essentially of a major portion of an alkylene halide and a minor portion of a lower aliphatic alcohol at an elevated temperature from about 50° to about 100° C. and at a pressure sufficient to maintain the solution in the liquid phase at the elevated temperature, and thereafter, while maintaining the spinning solution at the elevated temperature and the pressure, extruding it through a spinnerette into a heated downdraft cabinet at substantially atmospheric pressure thereby substantially removing the solvent from the copolymer, the improvement which comprises incorporating into the solution as a stabilizer from about 0.05 to 10% by weight based on the solution of an organic epoxy compound having from 2 to 20 carbon atoms and from 1 to 3 functional epoxy groups selected from the group consisting of aliphatic epoxides, aliphatic substituted cyclo-aliphatic epoxides and aromatic substituted aliphatic epoxides.

16. An improved spinning solution for use in dry spinning elastomeric copolymers which comprises a solution of from about 5 to about 25% by weight based on the total solution of an essentially linear, segmented, elastomeric copolymer in a solvent consisting essentially of about 60 to 95% by volume of an alkylene halide and about 40 to 5% by volume of a lower aliphatic alcohol, and from about 0.05 to 10% by weight based on the total solution of vinylcyclohexene dioxide as a stabilizer, the elastomeric copolymer being comprised essentially of first and second segments alternating in the copolymer chain, the first segment having the formula

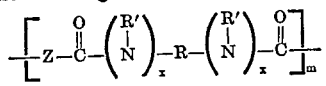

and the second segment having the formula

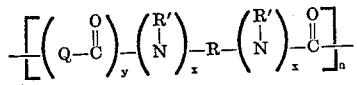

wherein Z is a bivalent radical which is inert to isocyanate groups at room temperature resulting from the removal of at least part of each of the terminal functional groups of a linear polymer melting below 50° C., having a molecular weight above about 600 and containing terminal functional groups possessing active hydrogen, R is a bivalent organic radical free of active hydrogen, Q is a bivalent chain-extending radical, $m$ and $n$ are integers greater than 0, $x$ and $y$ are integers from 0 to 1 with the provision that when one is 0 the other is 1, R' is a member of the class consisting of hydrogen and monovalent organic radicals, and the structure of the second segment represents a repeating unit of a linear crystalline polymer having a melting point above about 200° C. in its fiber-forming molecular weight range, and the epoxy compound containing from 2 to 20 carbon atoms and containing from 1 to 3 functional epoxy groups.

17. The spinning solution of claim 16, wherein the alkylene halide is methylene chloride and the aliphatic alcohol is methanol and wherein the spinning solution also contains up to 5 percent by weight of titanium dioxide based on the elastomeric copolymer present.

18. In the process of dry spinning an essentially linear, segmented, elastomeric copolymer which comprises dissolving from about 5 to about 25% by weight based on the total solution of a copolymer comprising first and second segments alternating in the copolymer chain, the first segment having the formula

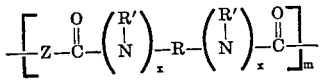

and the second segment having the formula
wherein Z is a bivalent organic radical which is inert to

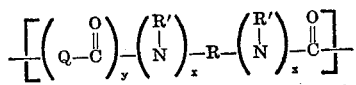

isocyanate groups at room temperature resulting from the removal of at least part of each of the terminal functional groups of a linear polymer melting below 50° C., having a molecular weight above about 600 and containing terminal functional groups possessing active hydrogen, R is a bivalent organic radical free of active hydrogen, Q is a bivalent chain-extending radical, $m$ and $n$ are integers greater than 0, $x$ and $y$ are integers from 0 to 1 with the provision that when one is 0 the other is 1, R' is a member of the class consisting of hydrogen and monovalent organic radicals, and the structure of the second segment represents a repeating unit of a linear crystalline polymer having a melting point above about 200° C., in its fiber-forming molecular weight range, in a solvent consisting essentially of a major portion of methylene chloride and a minor portion of methanol at an elevated temperature from about 50° to about 100° C. and at a pressure sufficient to maintain the solution in the liquid phase at the elevated temperature, and thereafter, while maintaining the spinning solution at the elevated temperature and the pressure, extruding it through a spinnerette into a heated downdraft cabinet at substantially atmospheric pressure thereby substantially removing the solvent from the copolymer, the improvement which comprises incorporating into the solution as a stabilizer from about 0.05 to 10% by weight based on the solution of vinylcyclohexene dioxide.

References Cited
UNITED STATES PATENTS

| | | | |
|---|---|---|---|
| 2,813,776 | 11/1957 | Koller | 260—77.5 |
| 2,962,470 | 11/1960 | Jung | 260—33.4 |
| 2,999,839 | 9/1961 | Arvidson et al. | 260—32.6 |
| 3,036,979 | 5/1962 | Wittbecker | 260—33.8 |
| 3,148,167 | 9/1964 | Keplinger | 260—45.8 |
| 3,204,013 | 8/1965 | Osborn et al. | 260—45.8 |
| 3,210,318 | 10/1965 | Dolce et al. | 260—45.8 |
| 3,281,379 | 10/1966 | Fontaine et al. | 260—45.8 |

MORRIS LIEBMAN, *Primary Examiner.*

B. A. AMERNICK, *Assistant Examiner.*

UNITED STATES PATENT OFFICE
CERTIFICATE OF CORRECTION

Patent No. 3,406,140                                  October 15, 1968

Walter John Polestak et al.

It is certified that error appears in the above identified patent and that said Letters Patent are hereby corrected as shown below:

Column 10, lines 25 to 27, that portion of the formula reading $$Q-\overset{O}{\underset{|}{C}} \quad \text{should read} \quad Q-\overset{O}{\underset{\|}{C}}$$

same column 10, line 28, "insert" should read -- inert --. Column 12, line 70, "is" should read -- in --. Column 13, line 46, cancel "wherein Z is a bivalent, organic radical which is inert" and insert the same after the formula in lines 1 to 3 in column 14. Column 14, lines 1 to 4, after the closing bracket, insert an inferior -- n --.

Signed and sealed this 10th day of March 1970.

(SEAL)
Attest:

EDWARD M. FLETCHER, JR.                      WILLIAM E. SCHUYLER, JR.
Attesting Officer                              Commissioner of Patents

UNITED STATES PATENT OFFICE
CERTIFICATE OF CORRECTION

Patent No. 3,406,160                                October 15, 196

Heinz Wicki

It is certified that error appears in the above identified patent and that said Letters Patent are hereby corrected as shown below:

Column 1, line 41, "groups" should read -- group --. Col 3, line 3, "said" should read -- acid --; line 13, "disazo" should read -- diazo --; lines 45 and 46, "that that" should r -- that the --. Column 11, line 29, "hTe" should read -- The Column 13, lines 31 to 39, the formula should appear as shown below:

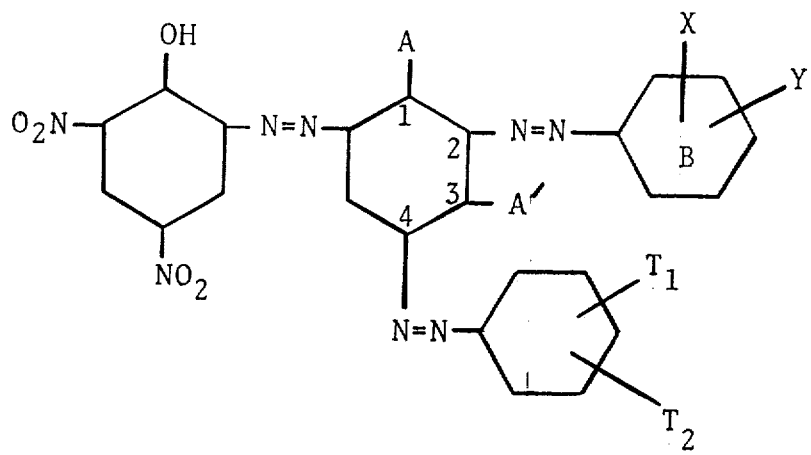

Signed and sealed this 3rd day of March 1970.

(SEAL)
Attest:

EDWARD M. FLETCHER, JR.
Attesting Officer

WILLIAM E. SCHUYLER, JR
Commissioner of Patents